(12) United States Patent
Hastreiter et al.

(10) Patent No.: US 7,061,739 B2
(45) Date of Patent: Jun. 13, 2006

(54) OVERCURRENT PROTECTION CIRCUIT

(75) Inventors: Karl-Heinz Hastreiter, Fürth (DE);
Robert Jung, Kümmersbruck (DE);
Michael Schröck, Amberg (DE)

(73) Assignee: Siemens Aktiengesellschaft, Munich (DE)

( * ) Notice: Subject to any disclaimer, the term of this patent is extended or adjusted under 35 U.S.C. 154(b) by 283 days.

(21) Appl. No.: 10/311,381

(22) PCT Filed: May 30, 2001

(86) PCT No.: PCT/DE01/02046

§ 371 (c)(1),
(2), (4) Date: Dec. 16, 2002

(87) PCT Pub. No.: WO01/97353

PCT Pub. Date: Dec. 20, 2001

(65) Prior Publication Data

US 2003/0137790 A1     Jul. 24, 2003

(30) Foreign Application Priority Data

Jun. 15, 2000   (DE) .............................. 100 29 418

(51) Int. Cl.
*H02H 3/08*    (2006.01)

(52) U.S. Cl. ........................................ 361/93.1

(58) Field of Classification Search ............. 361/93.1
See application file for complete search history.

(56) References Cited

U.S. PATENT DOCUMENTS

| | | | | |
|---|---|---|---|---|
| 3,058,034 A | * | 10/1962 | Sandin | 361/58 |
| 5,132,865 A | * | 7/1992 | Mertz et al. | 361/6 |
| 5,808,327 A | | 9/1998 | Maier et al. | 257/161 |
| 5,999,387 A | * | 12/1999 | Roesch et al. | 361/58 |
| 6,034,385 A | * | 3/2000 | Stephani et al. | 257/263 |
| 6,049,447 A | * | 4/2000 | Roesch et al. | 361/58 |
| 6,288,882 B1 | * | 9/2001 | DiSalvo et al. | 361/42 |
| 6,392,859 B1 | * | 5/2002 | Ohshima | 361/100 |
| 6,445,557 B1 | * | 9/2002 | Weinert et al. | 361/93.2 |

FOREIGN PATENT DOCUMENTS

| | | | |
|---|---|---|---|
| DE | 3445340 | * | 12/1984 |
| DE | 40 22 253 | | 1/1992 |
| DE | 197 25 870 A1 | | 1/1999 |
| WO | WO 93/07657 | | 4/1993 |
| WO | WO9311608 | * | 6/1993 |
| WO | WO 95/07548 | | 3/1995 |
| WO | WO 00/24105 | | 4/2000 |

* cited by examiner

*Primary Examiner*—Brian Sircus
*Assistant Examiner*—James A. Demakis
(74) *Attorney, Agent, or Firm*—Harness, Dickey & Pierce, P.L.C.

(57) ABSTRACT

Disclosed is an overcurrent protection circuit including an overcurrent trip and a switching element. A switched current passing through the switching element can be detected by the overcurrent trip and the switching element can be tripped to open if the switched current fulfils a tripping requirement. A current limiter is series-connected downstream of the switching element.

12 Claims, 2 Drawing Sheets

OVERCURRENT PROTECTION CIRCUIT

This application is the national phase under 35 U.S.C. § 371 of PCT International Application No. PCT/DE01/02046 which has an International filing date of May 30, 2001, which designated the United States of America and which claims priority on German Patent Application number DE 100 29 418.9 filed Jun. 15, 2000, the entire contents of which are hereby incorporated herein by reference.

FIELD OF THE INVENTION

The present invention generally relates to an overcurrent protection circuit. In particular, the present invention generally relates to an overcurrent release and a switching element, in which a switching current flowing through the switching element may be detected by way of the overcurrent release and opening of the switching element may be initiated if the switching current satisfies a tripping condition.

BACKGROUND OF THE INVENTION

Overcurrent protection circuits are generally known—in particular in the form of circuit breakers.

Circuit breakers generally have a thermal overload release and an electromagnetic quick-action release. If the current flowing through the circuit breaker slightly exceeds a rated current, tripping takes place with a time delay, by way of the thermal overload release. In the event of a short circuit, in contrast, when the current rises rapidly, the electromagnetic quick-action release trips the circuit breaker with virtually no delay. The tripping of the circuit breaker has two effects. First, the circuit is opened directly. Secondly, a switching mechanism is tripped, so that the circuit is not closed automatically again once the circuit breaker has tripped.

Despite tripping with virtually no delay, the electromagnetic release does have a reaction time. During the reaction time, the load current rises above the identification current at which the electromagnetic release trips. This results in a large amount of wear due to contact erosion in the contact that is to be opened. If the current rises too rapidly, a continuous arc may result. Such a continuous arc is difficult to quench, and a failure to do so may lead to the complete destruction of the circuit breaker. Furthermore, such a continuous arc may make it impossible to switch off the current.

SUMMARY OF THE INVENTION

An object of an embodiment of the present invention is to provide an overcurrent protection current in which an excessive rise in the current is prevented, even in the event of a short circuit in the load circuit.

An object of an embodiment of the present invention may be achieved by connecting a current limiter in series with the switching element.

If the current limiter has a steep current/voltage characteristic at low voltages and has a flat current/voltage characteristic at high voltages, this results in low power loss during normal operation of the overcurrent protection circuit, and in current limiting at a relative low value in the event of a short circuit.

In some cases, the current limiter may be in the form of a single component; however, generally it is in the form of a current limiting circuit.

Examples of a current limiter include the current limiter having two back-to-back series-connected transistors or (alternatively) two back-to-back parallel-connected series circuits, which each have one transistor and one diode.

Current limiting may also be achieved in an effective manner by the current limiter having two self-commutating transistors, each having a gate contact, a source contact and a drain contact. The source contacts may be connected to one another via a resistor. Additionally, the source contacts of the transistors may be connected to the gate contact of the respective other transistor, and the current limiter may be connected in series with the switching element via the drain contacts of the transistors.

If the transistors are in the form of SiC transistors, the current limiter has a particularly low resistance during normal operation, and can absorb a large amount of energy during short-circuit operation.

If the overcurrent release, the switching element and the current limiter are arranged in a common housing, this results in the overcurrent protection circuit being particularly compact. Furthermore, the overcurrent protection circuit may then be in the form of a unit which can be wired in advance.

Generally, the overcurrent release initiates the opening of the switching element with virtually no delay when a limit current is exceeded. If the current limiter is designed appropriately, it is also possible to open the switching element with a time delay when the limit current is exceeded.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
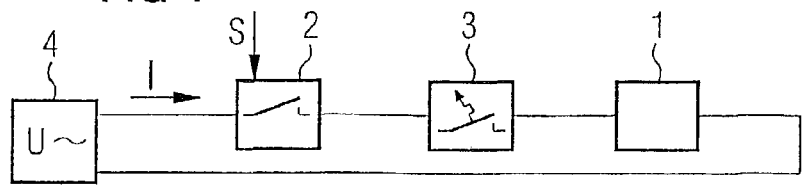
FIG. 1 illustrates a circuit.

As is illustrated in FIG. 1, a load 1 is connected to a voltage source 4 via an on/off switch 2 and an overcurrent protection circuit 3. The on/off switch 2 can be actuated from the outside by way of an appropriate control signal S. When the on/off switch 2 is closed, a switching current I flows through the overcurrent protection circuit 3 and through the load 1.

Figure 2:
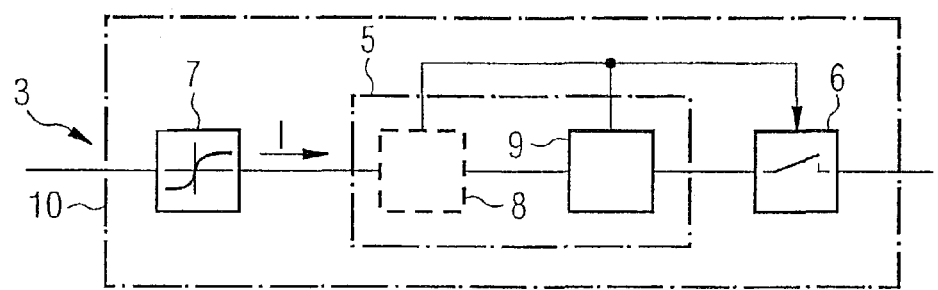
FIG. 2 illustrates an overcurrent protection circuit.

As illustrated in FIG. 2, the overcurrent protection circuit 3 has an overcurrent release 5, a switching element 6 and a current limiter 7. The switching element 6 is generally closed so that the switching current I can flow. However, the switching current I, which also flows through the switching element 6, can be detected by way of the overcurrent release 5. An opening of the switching element 6 can be initiated when the switching current I satisfies a tripping condition.

As can be seen from FIG. 2, the overcurrent release 5, the switching element 6 and the current limiter 7 are connected in series and are arranged in a common housing 10. The switching current I is in this case limited by way of the current limiter 7.

The overcurrent release 5 generally has two tripping elements 8, 9, namely an electromagnetic quick-action release 8 and a thermal overload release 9. The opening of the switching element 6 is initiated with virtually no delay by way of the quick-action release 8 when the switching current I exceeds a limit current that is several times a rated current, typically 12 or 19 times the rated current. Opening of the switching element 6 is initiated with a time delay by way of the overload release 9, when the switching current I is above the rated current for a relatively long time. For example, at 1.2 times, 1.5 times, twice or 7.2 times the rated current.

The switching element 6 has a switch so the circuit can be opened and closed as such. Moreover, the switching element 6 has a switching mechanism so the switch can be fixed in its open or closed position. When one of the tripping elements 8, 9 responds, not only is the switch of the switching element 6 opened, but the switching mechanism is also released. Once the switching element 6 has been opened, it is designed not to automatically close again.

In this case, in the event of a short circuit, initiation of the opening of the switching element 6 occurs with virtually no delay.

If, in contrast, the current limiter 7 is appropriately designed such that it copes with a short circuit until the thermal overload release 9 responds, there is no need for the quick-action release 8. This is indicated in FIG. 2 by the quick-action release 8 being shown only by dashed lines. Thus, in this case, the opening of the switching element 6 is initiated with a time delay even in the event of a short circuit.

Figure 3:
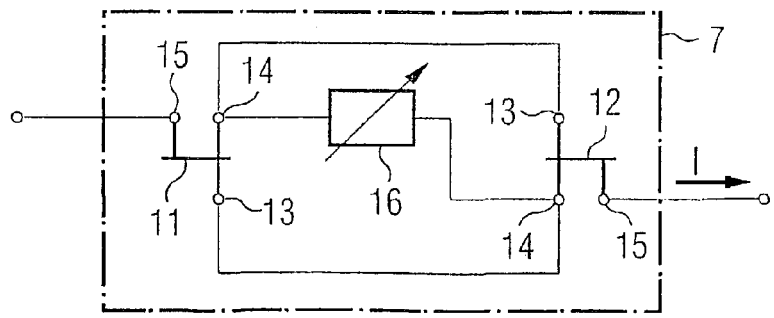
FIG. 3 illustrates a current limiter.

By way of example, FIG. 3 illustrates one possible refinement of the current limiter 7. As illustrated in FIG. 3, the current limiter 7 has two self-commutating transistors 11, 12. In principle, the transistors 11, 12 may be of any desired nature. In particular, they may be in the form of MOSFETs, IGBTs or else bipolar transistors. According to an exemplary embodiment, they are in the form of SiC field-effect transistors 11, 12. Each of the field-effect transistors 11, 12 has one gate contact 13, one source contact 14 and one drain contact 15. The source contacts 14 are connected to one another via a variable resistor 16. Furthermore, the source contacts 14 of the field-effect transistors 11, 12 are connected to the gate contact 13 of the respective other field-effect transistor 12, 11. The current limiter 7 is then connected in series with the switching element 6 via the drain contracts 15.

The current limiter illustrated in FIG. 3 may be formed from discrete components 11, 12, 16. However, as is indicated by a dashed-dotted line in FIG. 3, it may also be in the form of a monolithically integrated circuit.

Figure 4:
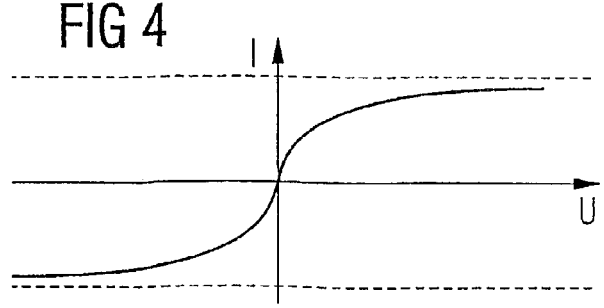
FIG. 4 illustrates a current/voltage characteristic.

The current limiter 7 illustrated in FIG. 3 has a current/voltage characteristic as shown in FIG. 4. As can be seen from FIG. 4, the characteristic has a steep profile at low voltages and has a flat profile at high voltages. In particular, the switching current I is substantially limited to the maximum value shown by the dashed line, even at high voltages U. The maximum value can be adjusted by appropriate adjustment of the resistor 16.

Figure 5:
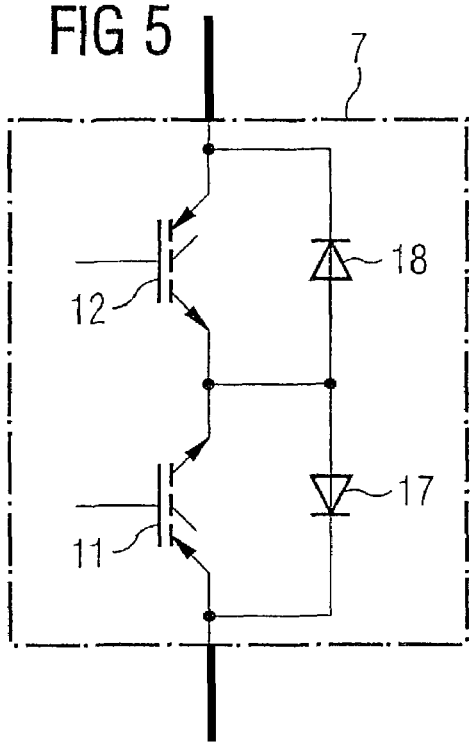
FIGS. 5 and 6 illustrates additional current limiters.
Figure 6:
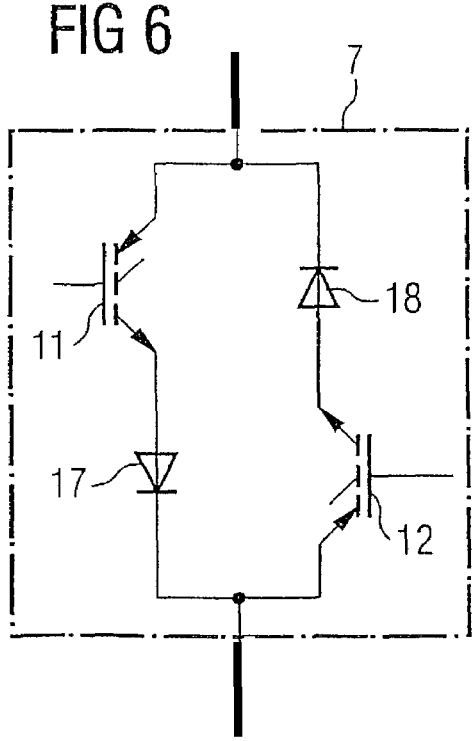

Alternatively, the transistors 11, 12 may also be connected back-to-back in series as illustrated in FIG. 5. In this case, a diode 17, 18 is preferably connected in parallel with each of them. In another exemplary embodiment illustrated in FIG. 6, the current limiter 7 has back-to-back parallel-connected series circuits. Each series circuit has a transistor 11 or 12, respectively, with which a diode 17, 18 is connected in series. The transistors 11, 12 are also in the form of SiC components in the embodiments shown in FIGS. 5 and 6.

The overcurrent protection circuit 7 according to an embodiment of the present invention is particularly suitable for use in AC voltage circuits. However, in principle, the protection circuit 7 may also be used in DC voltage circuits.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An overcurrent protection circuit, comprising:
an overcurrent release and a switching element; and
a current limiter connected in series with the switching element,
wherein a switching current flowing through the switching element is detectable by way of the overcurrent release and opening of the switching element is initiatable if the switching current satisfies a tripping condition,
wherein the current limiter includes two back-to-back parallel-connected series circuits, each of the two back-to-back parallel-connected series circuits having one transistor and one diode.

2. The overcurrent protection circuit as claimed in claim 1, wherein the current limiter has a steep current/voltage characteristic at low voltages, and has a flat current/voltage characteristic at high voltages.

3. The overcurrent protection circuit as claimed in claim 1, wherein the current limiter is in the form of a monolithically integrated circuit.

4. The overcurrent protection circuit as claimed in claim 1, wherein the overcurrent release, the switching element and the current limiter are arranged in a common housing.

5. The overcurrent protection circuit as claimed in claim 1, wherein the overcurrent release initiates the opening of the switching element with substantially no delay when the switching current exceeds a limit current.

6. The overcurrent protection circuit as claimed in claim 1, wherein the overcurrent release initiates the opening of the switching element with a time delay when the switching current exceeds a limit current.

7. The overcurrent protection circuit as claimed in claim 2, wherein the overcurrent release initiates the opening of the switching element with substantially no delay when the switching current exceeds a limit current.

8. The overcurrent protection circuit as claimed in claim 2, wherein the overcurrent release initiates the opening of the switching element with a time delay when the switching current exceeds a limit current.

9. A current protection circuit, comprising:
a switching element; and
an overcurrent release,
wherein the overcurrent release actuates an opening of the switching element once a current condition is reached,
wherein the current limiter includes two back-to-back parallel-connected series circuits, each of the two back-to-back parallel-connected series circuits having one transistor and one diode.

10. The current protection circuit according to claim 1, wherein the overcurrent release includes a plurality of tripping elements, one of the plurality of tripping elements being an electromagnetic quick-action release and another of the plurality of tripping elements being a thermal overload release.

11. The current protection circuit according to claim 1, wherein the opening of the switching element occurs once a current exceeds a current limit.

12. The current protection circuit according to claim 1, wherein the opening of the switching element occurs once a current is above a rated current level for a predetermined time period.

* * * * *